United States Patent Office 2,743,472
Patented May 1, 1956

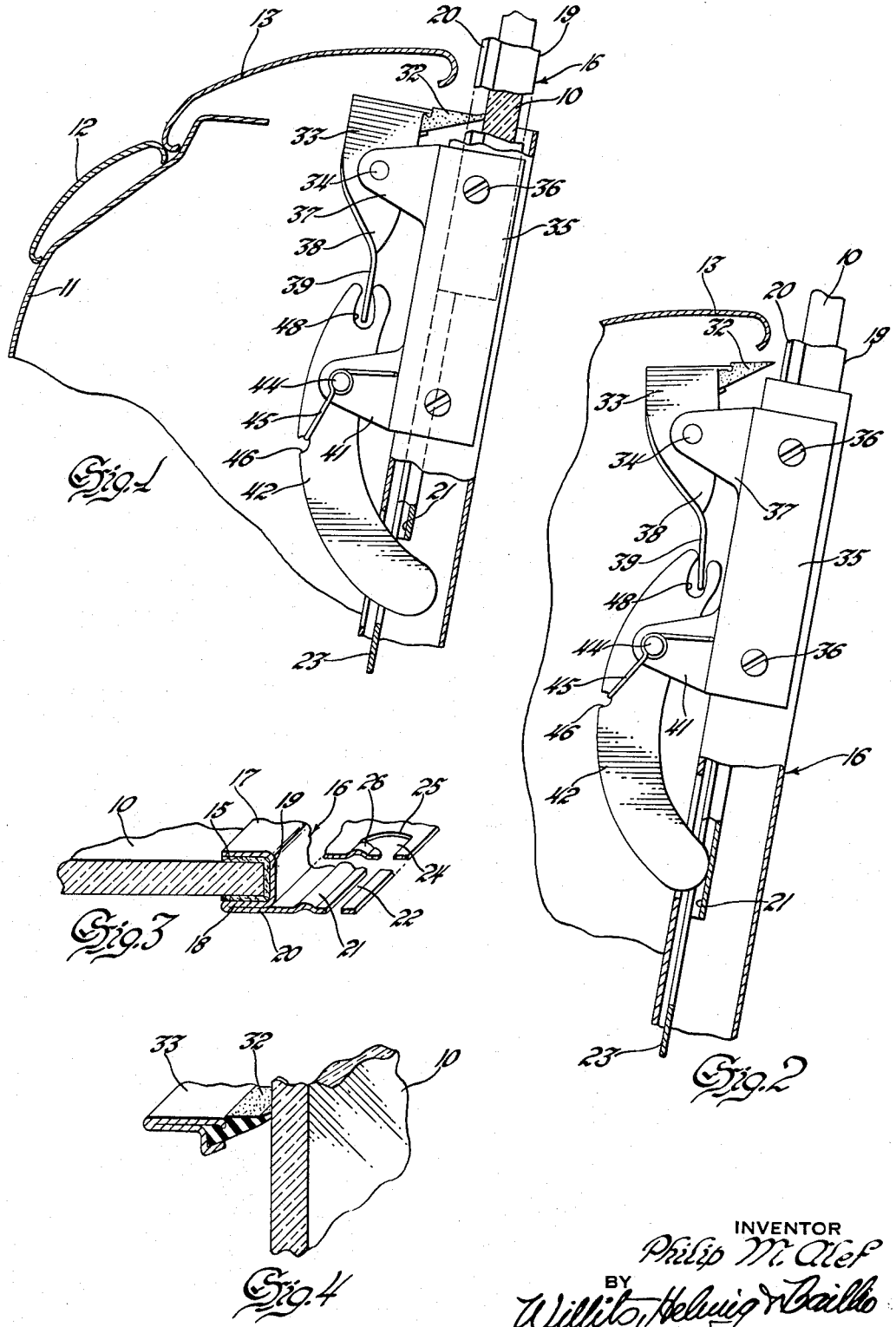

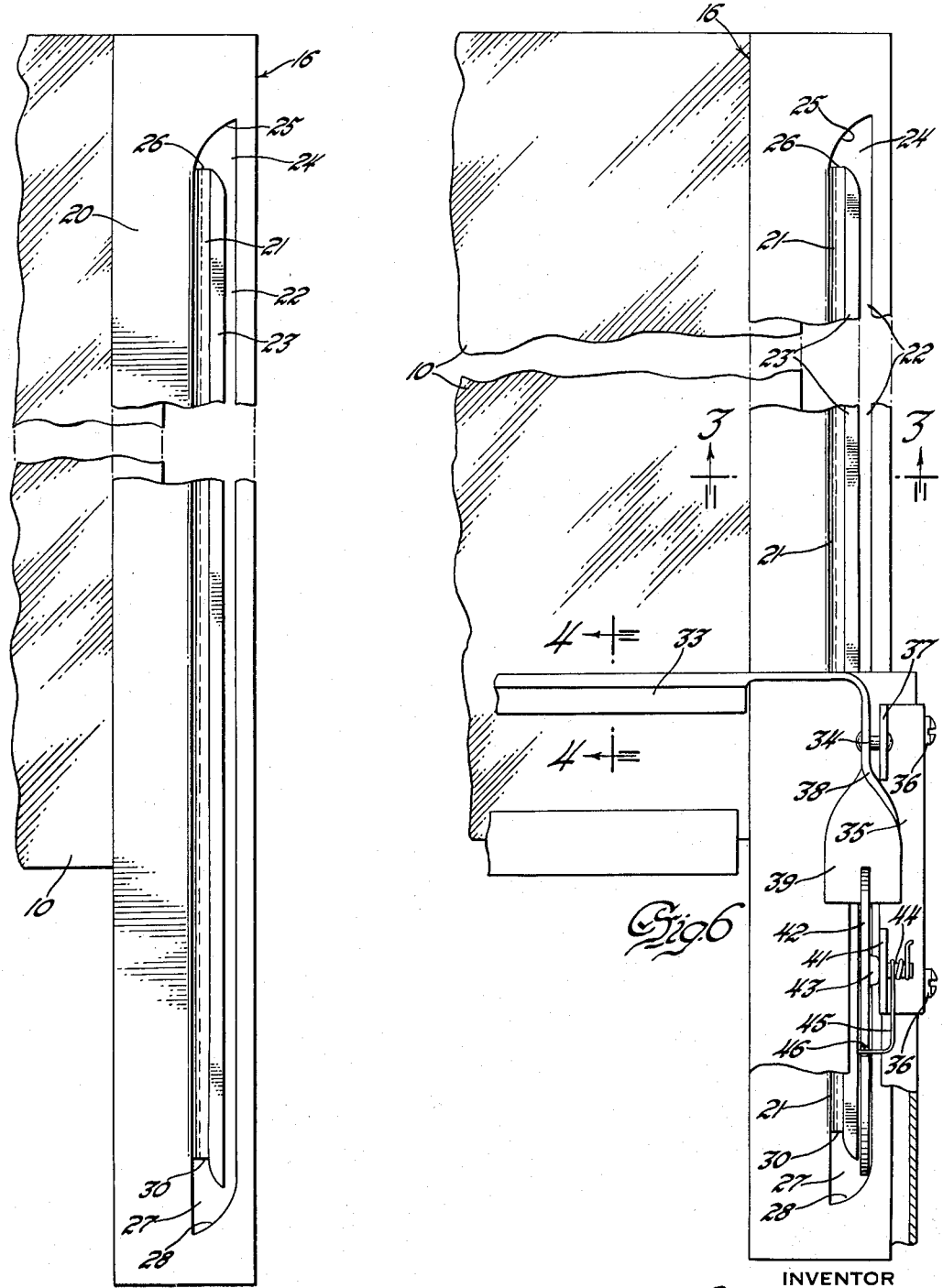

2,743,472

SIDE WINDOW WIPER

Philip M. Alef, Detroit, Mich., assignor to General Motors Corporation, Detroit, Mich., a corporation of Delaware Application December 17, 1952, Serial No. 326,533

8 Claims. (Cl. 15—250)

This invention relates to window wiping apparatus, and more particularly to apparatus for wiping the side window of an automobile or other vehicle.

Because automobile side windows are not fixed in position, but are capable of being raised and lowered, it is not practical to use an oscillating wiper of the type which is conventionally used to wipe automobile windshields. It has been proposed in the past to use a stationary wiper blade contacting the window adjacent the sill and to utilize the up and down movement of the window to provide wiping action, but such a construction is disadvantageous because the wiper blade contacts the glass when the window is moving down from its closed position and moisture and dirt are not removed from the window pane under such conditions, but are merely moved along the window pane and deposited near the upper edge thereof. When the window is closed again an unsightly streak of dirt is found adjacent the upper edge of the window and moisture mingled with the dirt runs down the window, so that the wiping has little or no effect.

I am disclosing an improved side window wiper in which vertical movement of the window pane is utilized to wipe the window, but instead of a stationary wiper blade I provide a wiper blade which is pivotally mounted adjacent the sill and which is movable, as a function of certain conditions of operation of the window, between a wiping position wherein the blade is in engagement with the window surface and a retracted position wherein the the blade is out of engagement therewith. Actuating means carried by the window cause movement of the wiper between wiping and retracted positions as a function of sliding movement of the window. When the window is moving from fully closed position the wiper is held in retracted position; however, when the window is fully closed, is fully open, or is moving from fully open position the wiper is held in wiping position in contact with the window glass. The blade does not engage the window pane when the window is moving from fully closed position, so that dirt and moisture are not deposited on the window pane above the wiper blade.

Other features and advantages of the invention will be apparent from the following description and from the drawings, in which:

Fig. 1 is a fragmentary vertical section through an automobile side window and door, showing the improved side window wiping apparatus with the wiper blade in wiping position;

Fig. 2 is a fragmentary section similar to Fig. 1, but showing the wiper blade in retracted position;

Fig. 3 is a fragmentary perspective view of a portion of one side of the window;

Fig. 4 is a fragmentary isometric section showing the blade in wiping position;

Fig. 5 is a fragmentary side elevational view of the window and the wiper actuating means carried by the window; and Fig. 6 is a fragmentary outside elevational view showing the apparatus with the outer door panel of the automobile removed.

Referring now more particularly to the drawings, an automobile side window 10 is vertically slidable in an automobile door having an outer door panel 11 with trim strips 12 and 13 extending along its upper edge, the panel 11 with the strips 12 and 13 providing a sill portion for the reception of the window 10. The window glass 10 is mounted in a peripheral channel 15, as is conventional, and manual or power operated means (not shown) are provided for moving the window between open and closed terminal positions. An actuating member designated generally as 16 has a channel shaped portion comprising legs 17 and 18 and a base 19, which fit over and are secured to the channel 15 so that the actuating member 16 is mounted on and is carried by the window 10. At the free side of the leg portion 18 of the actuating member 16 a flange 20 is bent back upon the leg 18, as shown best in Fig. 3. The flange 20 extends past the base 19 of the actuating member and is formed with a vertically extending groove 21 which forms a shallow track, and with a slot 22 parallel to groove 21 and forming a deep track. As shown best in Fig. 5 the flange 20 extends several inches below the bottom edge of the window 10. The tracks are separated throughout most of their length by a partition 23 which lies in the plane of the body of the flange 20, and adjacent the upper edge of the flange 20 the partition 23 terminates and the slot 22 is widened as shown at 24 in Figs. 4 and 5. The upper periphery of the slot 22 and the space 24 is defined by a cam surface 25 which extends in a curved line from the inner edge of the upper end of the groove 21 to the outer edge of the upper end of the slot 22. In Figs. 3 and 5 the upper edge of the shallow groove 21 is designated as 26. Adjacent the lower edge of the flange 20 the slot 22 is widened at 27 and the lower periphery of the slot 22 and space 27 is defined by a cam surface 28 which extends in a curved line as shown in Figs. 5 and 6. In Figs. 5 and 6 the lower edge of the shallow groove 21 is designated as 30.

An elongated wiper blade 32 is mounted in a metal holder 33 which is pivotally mounted at 34 on an ear 37 projecting from a bracket 35 which is secured by screws 36 to a stationary part of the automobile door. The wiper assembly extends substantially entirely across the window and may be pivotally mounted at its other end in a similar manner to provide for pivotal movement of the wiper blade 32 between a wiping position as shown in Figs. 1 and 4, wherein the blade engages the window glass 10, and a retracted position as shown in Fig. 2, wherein the blade 32 is pivoted out of contact with the window glass 10.

In order to provide for pivotal movement of the wiper blade 32 between wiping and retracted positions as a function of sliding movement of the window 10, the blade holder 33 has adjacent its end a lug 38 which projects past the pivotal mounting point 34 and which is twisted as shown at 39 in Figs. 1, 2 and 6. The support bracket 35 has adjacent its lower end an apertured ear 41 upon which a curved link 42 is pivotally mounted. At a point between its ends the link is provided with a hub 43 (see Fig. 6) from which projects a mounting stud 44 which extends through the aperture in the ear 41. A spring 45 supported on stud 44 has one end anchored on the support bracket 35 and the other end anchored in a notch 46 in the link 42 in order to bias the link in a counterclockwise direction as the parts appear in Figs. 1 and 2. The upper end of the link 42 has a slot 48 which receives the end of the twisted portion 39 of the wiper holder lug, thus providing a movable connection between the wiper and the link 42. The lower end of the link 42 is adapted to ride in one of the tracks 21 or 22, according to predetermined conditions of operation of the window, the hub 43 providing a loose mounting for the link by spacing the body portion of the link from the adjacent surface of the ear 41, and the stud 44 providing a mounting whereby the link is not only pivoted about the axis of the stud 44, but is bodily movable along the axis of said stud.

The operation of the apparatus is best seen from a consideration of Figs. 1, 2 and 6. In Fig. 1 the window is in a condition of operation wherein it is moving from fully open position; in Fig. 2 the window is moving from fully closed position; and in Fig. 6 the window is moving from fully open position, and is only of the order of ¼ inches of movement from fully closed position. During movement of the window from fully open position the link 42 rides in the deep track provided by slot 22, as shown in Figs. 1 and 6, and in Fig. 6 the link has just started to engage the cam surface 28, so that the remaining approximate ¼ inch of movement will cause the cam surface 28 to move the link 42 bodily to the left as the parts appear in Fig. 6 so that said link is aligned with the shallow track provided by groove 21. When the window starts to move down from its fully closed position the link 42 rides in the shallow track provided by groove 21, as shown best in Fig. 2, and the link 42 pivots against the force of spring 45 in a clockwise direction from its position in Fig. 1, causing pivotal movement of the wiper blade assembly in a counterclockwise direction to move the wiper blade into its retracted position as shown in Fig. 2.

As the window approaches its fully open position the free end of the link 42 will enter the open space 24, permitting the spring 45 to pivot the link and wiper into wiping position, and the cam surface 25 will cause bodily movement of the link 42 to the right as the parts appear in Fig. 6, so that when the window reaches its full down position the link is aligned with the deep track formed by slot 22, and upon upward movement of the window from fully open position the link travels in the deep track and the spring 45 holds the wiper blade 32 in wiping engagement with the surface of the window glass 10.

In the event that more positive means are desired for moving the link 42 bodily into alignment with the shallow track 21 when the window reaches its full up position, spring means may be provided biasing the link bodily to the left as the parts appear in Fig. 6 or the spring 45 may be arranged to provide such a bias.

While I have shown and described one embodiment of my invention, it is capable of many modifications. Changes, therefore, in the construction and arrangement may be made without departing from the spirit and scope of the invention as set forth in the appended claims.

I claim:
1. Apparatus of the character described, including: a slidable window; a wiper member mounted for movement between wiping position in engagement with the window surface and retracted position out of engagement therewith; cam guide means; and actuating means comprising a follower engaging said cam guide means for moving said wiper between wiping and retracted positions as a function of sliding movement of said window.

2. Apparatus of the character described, including: a vertically slidable window; sill means for receiving said window when it is lowered; a wiper member pivotally mounted on said sill for movement between wiping position in engagement with the window surface and retracted position out of engagement therewith; guide means mounted on said window, including a cam track; and actuating means comprising a follower mounted on said sill and engaging said cam track for pivoting said wiper between wiping and retracted positions as a function of sliding movement of said window.

3. Apparatus of the character described for wiping a slidable window, including: a wiper member pivotally mounted for movement between wiping position in engagement with the window surface and retracted position out of engagement therewith; an operating link having a portion movably connected with said wiper, said link being mounted for pivotal movement and for bodily movement along its pivotal axis; and actuating means carried by said window and having a first track receiving said link when the window is in one condition of operation to arrange said wiper in wiping position and a second track receiving said link when the window is in another condition of operation to arrange said wiper in retracted position, said tracks having cam portions adjacent opposite ends and said link being bodily movable by engagement with said cam portions between said first and second tracks upon movement of said window.

4. Apparatus of the character described, including: a slidable window movable between two terminal positions; a wiper member pivotally mounted for movement between wiping position in engagement with the window surface and retracted position out of engagement therewith; an operating link having a portion movably connected with said wiper, said link being mounted for movement about a pivotal axis and for bodily movement along its pivotal axis; actuating means carried by said window and having a first track receiving said link when the window is in one condition of operation to arrange said wiper in wiping position and a second track receiving said link when the window is in another condition of operation to arrange said wiper in retracted position; and cam means on said actuating means for moving said link bodily between said first and second tracks when the window has reached either of its terminal positions.

5. Apparatus of the character described for wiping a slidable window, including: a wiper member pivotally mounted for movement between wiping position in engagement with the window surface and retracted position out of engagement therewith; yieldable means biasing said wiper toward one of said positions; and actuating means carried by said window and having cam means operative when the window is in one condition of operation to permit the wiper to move into one position under the influence of said yieldable means and cam means operative when the window is in another condition of operation to hold said wiper in the other position against the force of said yieldable means.

6. Apparatus of the character described, including: a slidable window movable between two terminal positions; a wiper member pivotally mounted for movement between wiping position in engagement with the window surface and retracted position out of engagement therewith; spring means biasing said wiper toward wiping position; and actuating means carried by said window and having cam track means operative when the window is in one condition of operation to permit the wiper to move into wiping position under the influence of said spring and cam track means operative when the window is in another condition of operation to hold said wiper in retracted position against the force of said spring.

7. Apparatus of the character described, including: a slidable window movable between open and closed terminal positions; a wiper member pivotally mounted for movement between wiping position in engagement with the window surface and retracted position out of engagement therewith; an operating link having a portion movably connected with said wiper, said link being mounted for movement about a pivotal axis and for bodily movement along its pivotal axis; spring means biasing said wiper toward wiping position; actuating means carried by said window and having a first track receiving said link when the window is in either terminal position or is moving from open terminal position to permit said wiper to move into wiping position under the influence of said spring and a second track receiving said link when the window is moving from closed terminal position to hold said wiper in retracted position against the force of said spring; and cam means adjacent the ends of said tracks on said actuating means for moving said link bodily into alignment with one of said tracks when the window has reached either of its terminal positions.

8. Apparatus of the character described for wiping a movable window, including: a wiper member mounted for movement between wiping position in engagement with the window surface and retracted position out of engagement therewith: a movably mounted operating link having a portion engaging said wiper; and actuating means carried by said window, said actuating means having cam portions in positive engagement with said link to cause movement of said link to move said wiper between wiping and retracted positions in accordance with predetermined conditions of operation of said window.

References Cited in the file of this patent

UNITED STATES PATENTS

| | | |
|---|---|---|
| 1,054,053 | Talbert | Feb. 25, 1913 |
| 1,122,438 | Tanner | Dec. 29, 1914 |
| 1,633,479 | De Rosa | June 21, 1927 |
| 2,666,941 | Oishei | Jan. 26, 1954 |

FOREIGN PATENTS

| | | |
|---|---|---|
| 214,520 | Great Britain | Apr. 24, 1924 |